United States Patent
Schmidt et al.

(10) Patent No.: US 12,101,368 B2
(45) Date of Patent: *Sep. 24, 2024

(54) CAPTURE, RECORDING, AND STREAMING OF MEDIA CONTENT

(71) Applicant: Google LLC, Mountain View, CA (US)

(72) Inventors: Brian Schmidt, Sunnyvale, CA (US); George Leiming Xing, Mountain View, CA (US); Matt Snider, Sunnyvale, CA (US); Sunbir Gill, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,049

(22) Filed: May 3, 2023

(65) Prior Publication Data

US 2023/0275951 A1  Aug. 31, 2023

Related U.S. Application Data

(63) Continuation of application No. 17/745,844, filed on May 16, 2022, now Pat. No. 11,677,801, which is a continuation of application No. 17/135,921, filed on Dec. 28, 2020, now Pat. No. 11,336,709, which is a continuation of application No. 16/356,998, filed on Mar. 18, 2019, now Pat. No. 10,880,350, which is a continuation of application No. 15/294,143, filed on Oct. 14, 2016, now Pat. No. 10,237,319.

(60) Provisional application No. 62/241,612, filed on Oct. 14, 2015.

(51) Int. Cl.
| | |
|---|---|
| *H04L 65/75* | (2022.01) |
| *H04L 41/50* | (2022.01) |
| *H04L 41/5025* | (2022.01) |
| *H04L 43/106* | (2022.01) |
| *H04L 65/70* | (2022.01) |
| *H04L 65/80* | (2022.01) |

(52) U.S. Cl.
CPC ........ *H04L 65/762* (2022.05); *H04L 41/5025* (2013.01); *H04L 41/509* (2013.01); *H04L 43/106* (2013.01); *H04L 65/70* (2022.05); *H04L 65/80* (2013.01)

(58) Field of Classification Search
CPC . H04L 65/762; H04L 41/5025; H04L 41/509; H04L 43/106; H04L 65/70; H04L 65/80
See application file for complete search history.

(56) References Cited

U.S. PATENT DOCUMENTS

| | | | |
|---|---|---|---|
| 6,978,417 B1 | 12/2005 | Kohn et al. | |
| 7,761,901 B2 | 7/2010 | Walker et al. | |
| 2004/0037540 A1* | 2/2004 | Frohlich | G11B 33/0488 |
| 2009/0030976 A1 | 1/2009 | Shukla et al. | |
| 2009/0086090 A1 | 4/2009 | Uchida | |
| 2011/0151924 A1 | 6/2011 | Miller | |
| 2015/0035940 A1 | 2/2015 | Shapiro et al. | |
| 2016/0277469 A1 | 9/2016 | Gilson et al. | |
| 2016/0291814 A1 | 10/2016 | Pigat et al. | |
| 2017/0282075 A1 | 10/2017 | Michot et al. | |

* cited by examiner

*Primary Examiner* — Brian Whipple
(74) *Attorney, Agent, or Firm* — Lowenstein Sandler LLP

(57) ABSTRACT

A method includes receiving user input indicating a selection of a subset of two or more of a plurality of audio layers for media content to be provided to a user, each of the subset of audio layers corresponding to one or more audio sources, receiving second user input indicating volume levels for the two or more audio layers of the plurality of audio layers, capturing, based on the first user input, the two or more audio layers of the plurality of audio layers for a media content item to be provided to the user, and enabling audio playback based on the two or more audio layers of the plurality of audio layers and without including other audio layers of the plurality of audio layers, the audio playback reflecting the volume levels indicated by the second user input. The method further includes causing the media content item to be provided to the user using the audio playback reflecting the indicated volume levels.

22 Claims, 12 Drawing Sheets

CAPTURE, RECORDING, AND STREAMING OF MEDIA CONTENT

RELATION APPLICATION

This application is a continuation application of co-pending U.S. patent application Ser. No. 17/745,844, filed May 16, 2022, which is a continuation application of U.S. patent application Ser. No. 17/135,921, filed Dec. 28, 2020, now U.S. Pat. No. 11,336,709, which is a continuation application of U.S. patent application Ser. No. 16/356,998, filed Mar. 18, 2019, now U.S. Pat. No. 10,880,350, which is a continuation application of U.S. patent application Ser. No. 15/294,143 filed on Oct. 14, 2016, now U.S. Pat. No. 10,237,319, which claims priority to and claims the benefit under 35 U.S.C. § 119(e) of U.S. Provisional Application No. 62/241,612 filed on Oct. 14, 2015, each of which is incorporated herein by reference.

BACKGROUND

Field

This disclosure relates generally to capturing and streaming of media content, and in particular to capturing video and audio content associated with game play directly from a mobile device.

Description of Related Art

One popular type of content on video hosting sites is videos depicting gameplay captured on video game consoles or desktop computers. Technology exists on those platforms to capture and record the screen contents and the system audio. Additionally, video and audio recordings of the game player are sometimes obtained via a webcam and microphone and presented in conjunction with the gameplay content. As game play moves to mobile devices, gaming video creators will need a way to capture gameplay on those devices. Today, this is typically accomplished by connecting a mobile device to specialized recording equipment, which is generally suitable only for professionals. Furthermore, current approaches require privileged access to certain system resources or require modification of the applications in order to record.

SUMMARY

Disclosed embodiments include systems and methods for capturing activity on the mobile device without requiring special privileges and without modifying third-party applications. In some embodiments, the computer-implemented method includes selecting at least one layer from a plurality of layers of media available on a local device and presenting the plurality of layers at the local device. The method also includes creating an output layer by capturing the at least one layer without capturing unselected layers of the plurality of layers. The method further includes encoding the output layer into a format compatible with a media hosting service to create an encoded stream and transmitting the encoded stream to the media hosting service for presentation at a remote device. Some embodiments of the non-transitory computer-readable medium includes instructions that, when executed, cause one or more processors to perform the computer-implemented method. Some embodiments of the system includes such a non-transitory computer-readable medium and one or more processors for executing the instructions.

The features and advantages described in this summary and the following description are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features that will be more readily apparent from the detailed description and the accompanying figures. A brief introduction of the figures is below.

DETAILED DESCRIPTION

Figure 1:
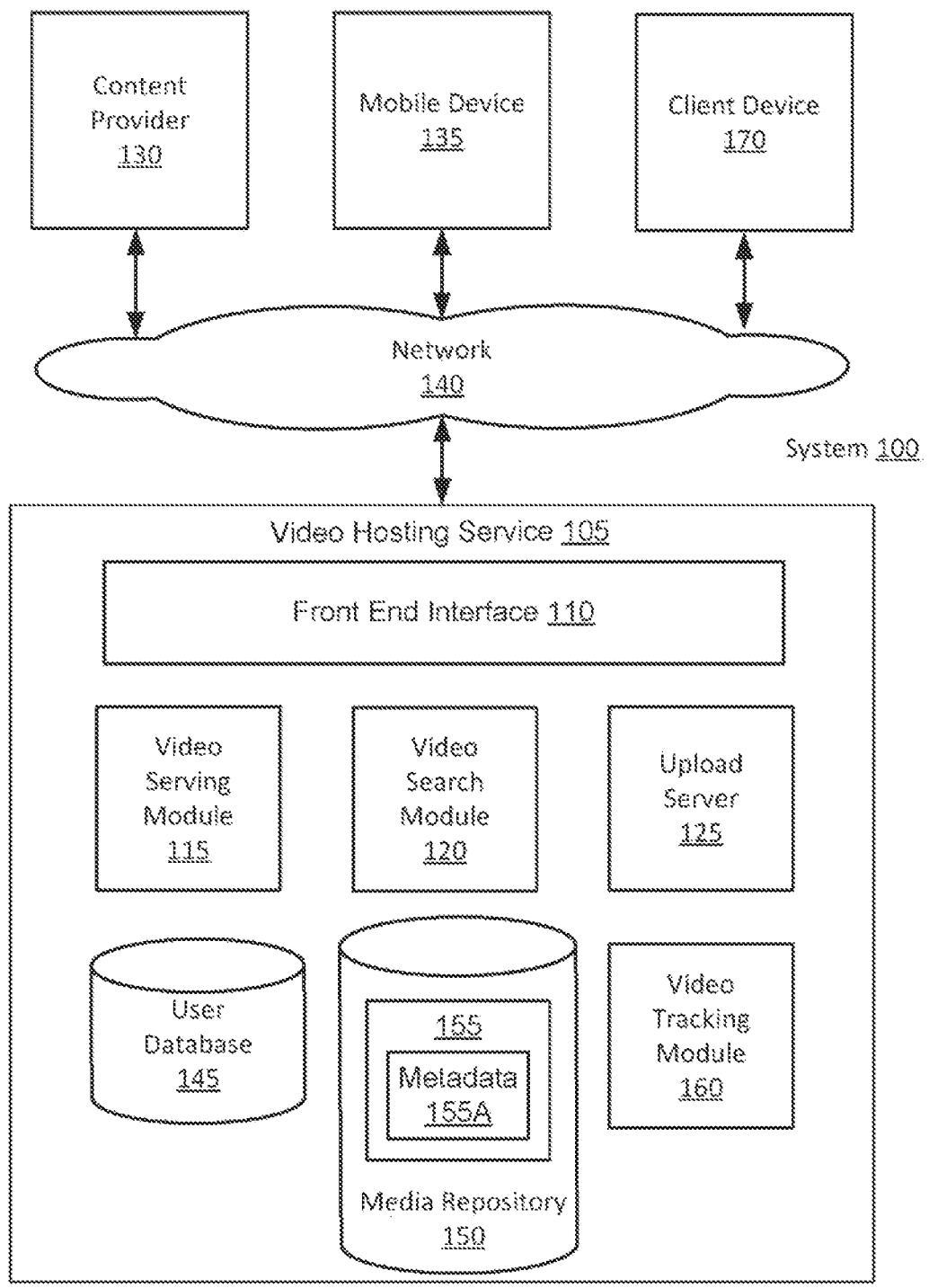
FIG. 1 is a block diagram of the overall architecture of one embodiment of a stream capture system.

In many instances, the operating system of mobile devices limits access to what is displayed on the screen and output by speakers of a mobile device to certain privileged applications. These applications are generally those provided by the manufacturer of the device and sometimes certain trusted partners (e.g., a telecom company that provides the device to its customers). In various embodiments, a screencasting application with such privileged access is used to enable screencasting of third party applications (e.g., games). Alternatively, the screencasting functionality can be built into applications that are provided by the manufacturer or a trusted partner ("1st party applications").

In some embodiments, the screencasting application employs sub-composition of graphics layers in recording and streaming videos, which allows capture of only the relevant video layers and not other layers (e.g., user notifications) that are displayed locally. In one such embodiment, each layer is tagged with its owning application and a user can select which layers to pre-compose via a screencast application (e.g., a dedicated screencast application that creates the screencast recording or live stream on behalf of another application). Alternatively, the screencast control functionality can be built into the application (e.g., a game provided by the device manufacturer) that is to be streamed. The sub-composition is made available to the requesting application, and the remaining layers are added to the sub-composition layers for local display. For example, video from a game and video captured by a front- or rear-facing camera might be included in the pre-composition, while system notifications might only be produced locally.

Additionally or alternatively, the screencasting application may employ virtual display frame rate conversion (FRC), which improves encoder logic for better video with less lag. A virtual display represents a display device on which normal graphics can be drawn. In one embodiment, the content of a virtual display includes a copy of the content of the physical display screen. The content of the virtual display can then be mapped to a physical display, e.g., remote projection over an HDMI port, or piped into an encoder to make a video.

In some embodiments, the screencasting application employs sub-mix of audio tracks (also referred to herein as "audio layers") such that the application only captures the target application's audio and not unrelated system audio. In one such embodiment, each audio track is tagged with its owning application and the user can select which audio tracks to pre-mix. The pre-mix is made available to the requesting application, and the remaining tracks and pre-mix are mixed for local audio output. For example, audio from a game and the device's microphone might be included in the pre-mix, while unrelated audio such as system notifications and music not related to the game is only reproduced locally.

In other embodiments, the screencasting application employs audio stream and track duplication, in which the requesting application can capture audio while it continues to play through the local output (e.g., speakers or headphones). In still other embodiments, the screencasting application employs sub-mix permissions, which allow third party applications to mark audio tracks as secure such that they are not recorded.

In further embodiments, the screencasting application captures the primary display output (e.g., pixel data from the frame buffer) and the primary audio output (e.g., sample data from the speaker).

Regardless of the details of how it is captured, in various embodiments, the screencasting application encodes the captured display output in a video hosting service-compatible video format and encodes the captured audio in a hosting service-compatible audio format. The screencasting application then multiplexes the video and audio data into a file container format. The multiplexed video and audio data can be streamed live, saved locally and uploaded to a video content hosting service at a later time, or both.

In various embodiments, the full set of encoder capabilities are made available to requesting applications. This enables the screencast application to select the best codec with the most useful set of parameters for the recording or live stream, based on characteristics such as whether there is hardware acceleration, the best frame rate that can be sustained, the highest bitrate that can be sustained, etc. Foreground application detection enables the screencast application (i.e., the application making the screencast recording or live stream) to be notified when the requesting application (i.e., the application being recorded or streamed) is or is no longer in the foreground, thus allowing screencasting to be paused or resume recording, if desired, so that only the activity of one or more target applications is captured. In some embodiments, the screencast application provides controls to allow the user to enable and disable video and audio capture.

As noted above, the described embodiments enable screencasting from mobile devices to a video content hosting service. In some embodiments, the encoded video is first saved to a video file stored locally on the device, and later uploaded to the video content hosting service. In other embodiments, screencasting occurs substantially in real-time by streaming the encoded video to the video hosting service for live broadcast.

In some embodiments, the screencasting application captures the video preview from a front- or rear-facing camera, encodes the preview in a video hosting service-compatible video format, and includes the preview as a separate video track in the screencast. In one such embodiment, the front-facing camera is overlaid on top of the display, and a single video is delivered to the video hosting service. In another embodiment, the front-facing camera is recorded as its own separate video track or stream, and either visible or not visible to the user on-screen. Two video tracks, screencast and camera, are then composited by the video hosting service into a variety of formats to produce multiple versions of a single video stream, e.g. side-by-side, camera overlaid in top right corner, screencast overlaid on camera, etc.

On many mobile platforms, two barriers often exist that prevent recording the primary audio output for screencasting. First, sound may not be played locally when the output is being recorded. Second, sample data must be copied to the encoder by a separate, application-level process, which introduces added latency. To obviate these difficulties, in one embodiment the audio framework on the mobile device is extended to enable simultaneous delivery of buffers of sample data to the downstream mixer for output, as well as to the encoder. To avoid additional data copies, audio buffers support multiple consumers. Additionally, an interface is provided to applications to request delivery of a "record" mix to an audio encoder, similar to the existing "remote" sub-mix but tagged to a particular application and any additional desired tracks.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (and method) for purposes of illustration only. One skilled in the art will readily recognize from the following description that alternative embodiments of the structures and methods illustrated herein may be employed without departing from the principles described herein.

FIG. 1 illustrates a block diagram of a system 100 for providing stream capture, recording, and streaming of video game content on a mobile device in accordance with one embodiment. In the embodiment shown, the system 100 includes a video hosting service 105, a content provider 130, a mobile device 135, and a client device 170, all connected via a network 140 (e.g., the Internet). Other embodiments of the system 100 include different or additional components. In addition, the functions may be distributed among the components in a different manner than described herein.

In one embodiment, the video hosting service 105 stores and provides videos to clients such as a client device 170 and mobile device 135, including both user-generated videos and commercially/professionally generated videos. The user-generated videos include screencasts of games played on a mobile device 135. The video hosting service 105 communicates with a plurality of content providers 130 and client devices 170 via the network 140 to facilitate sharing of video content between users. Note that although FIG. 1 only shows one content provider 130, mobile device 135, and client device 170 for the sake of clarity, there can be any number of each.

In the embodiment shown in FIG. 1, the video hosting service 105 includes a front end interface 110, a video serving module 115, a video search module 120, an upload server 125, a user database 145, a media repository 150, and a video tracking module 160. Other conventional features, such as firewalls, load balancers, authentication servers, application servers, failover servers, site management tools, and so forth are not shown so as to more clearly illustrate the features of the video hosting service 105. One example of a suitable service 105 is YouTube 1M. Other video hosting services are known and can be adapted to operate according to the teachings disclosed herein. Similarly, systems that host audio recordings, images, interactive graphics, text or hypertext documents, and downloadable applications can be adapted to be operated as described herein.

The illustrated components of the video hosting service 105 can be implemented as single or multiple components of software and hardware. In general, functions described in one embodiment as being performed by one component can also be performed by other components in other embodiments, or by a combination of components. Furthermore, functions described in one embodiment as being performed by components of the video hosting service 105 can also be performed by one or more client devices 170 in other embodiments if appropriate.

In one embodiment, the front end interface 110 provides the interface between the client device 170 and the various components of the video hosting service 105. The upload server 125 of the video hosting service 105 receives video content from a content provider 130, and processes the content for storage and playback. The received content is stored in the media repository 150. In response to requests from the client devices 170, a video serving module 115 provides video data from the media repository 150 to the client devices 170. The video search module 120 enables users to search the media repository 150, such as by entering textual queries containing keywords of interest or using playlists, channels, recommendations, and the like.

In some embodiments, the user database 145 is configured to maintain a record of registered users of the video hosting service 105. Registered users include content providers and/or users of the client devices 170 who view videos on the video hosting service 105. Each content provider 130 and/or individual user registers account information, which may include login name, electronic mail (e-mail) address, and password with the video hosting service 105, and is provided with a unique user ID. The user ID can be based on any identifying information, such as the user's IP address, user name, or the like. This account information is stored in the user database 145. Users have the opportunity to specify that the account information not be shared with other components of the video hosting service 105, or with other third-party systems. In some embodiments, users that have not registered may still use the video hosting service 105, though some features may be unavailable to unregistered users.

In various embodiments, the media repository 150 contains a set of media content items 155 submitted by users. The media repository 150 can contain any number of media content items 155, such as tens of thousands or hundreds of millions. Each of the media content items 155 has a unique identifier that distinguishes it from each of the other media content items, such as a textual name (e.g., the string "a9lqrx8"), an integer, or any other way of uniquely naming the content item. The media content items 155 can be packaged in various containers such as AVI, MP4, MOV, or WebM, and can be encoded using codecs such as VP8, MPEG-2, MPEG-4, H.264, and the like. In one embodiment where a mobile device 135 is capturing media content such as game play footage and transmitting it to the video hosting service 105 for live streaming, the upload server 125 receives the stream from the mobile device 135, passes it to the media repository 150, and the stream is then made available immediately to the client devices 170. Alternatively, the media content might be streamed live but not recorded, and never sent to the media repository 150.

In some embodiments, the videos 155 have associated metadata 155A in addition to audiovisual content. In one such embodiment, the metadata 155A include textual metadata such as a video title, a video description, and/or tags provided by a user who uploaded the video, as well as user comments provided by users viewing the video. The metadata 155A may also include an uploader-specified category designating one of a set of categories specified by the video hosting service 105, such as games, sports, entertainment, music, or the like. Although such textual metadata are typically provided by the video uploader and/or other users, they may also be provided or modified automatically by the video hosting service 105.

The client devices 170 are computing devices that execute client software, e.g., a web browser or built-in client application, to connect to the front end interface 110 of the video hosting service 105 via a network 140 and display videos. A client device 170 might be, for example, a personal computer, a personal digital assistant, a cellular, mobile, or smart phone, laptop computer, television, set top box, game console, public indoor or outdoor display, movie theater, or wearable computer.

Conceptually, the content provider 130 (and the mobile device 135 when it is providing gaming videos to be streamed live or stored) is an entity that provides video content to the video hosting service 105. In practice, some content providers (e.g., individual users who upload user generated content) may also be content viewers. Additionally, the content provider 130 may be provided by the same entity that operates the video hosting service 105. Content provider functions may include, for example, uploading a video file to the video hosting service 105, editing a video file stored by the video hosting service 105, or editing content provider preferences associated with a video file.

The client device 170 operates on a device to view video content stored by the video hosting service 105. The client device 170 may also be used to configure viewer preferences related to video content. In some embodiments, the client device 170 includes an embedded video player adapted for the video file formats used in the video hosting service 105. Note that the terms "client device" and "content provider" as used herein may refer to software providing client and content providing functionality, to hardware on which the software executes, or to the entities operating the software and/or hardware, as is apparent from the context in which the terms are used.

The mobile device 135 may comprise a personal computer or other network-capable device such as a personal digital assistant (PDA), a mobile telephone, a pager, a television "set-top box," and the like. The mobile device 135 may act as a client device 170 or as a content provider 130, depending on whether it is receiving content to be viewed by a user, or generating gaming content to be stored or streamed by the video hosting service 105. The mobile device 135 is described further below with respect to FIG. 2.

The network 140 is typically the Internet, but may be any network, including but not limited to a LAN, a MAN, a WAN, a mobile wired or wireless network, a cloud computing network, a private network, or a virtual private network.

Asynchronous Architecture

Figure 2:
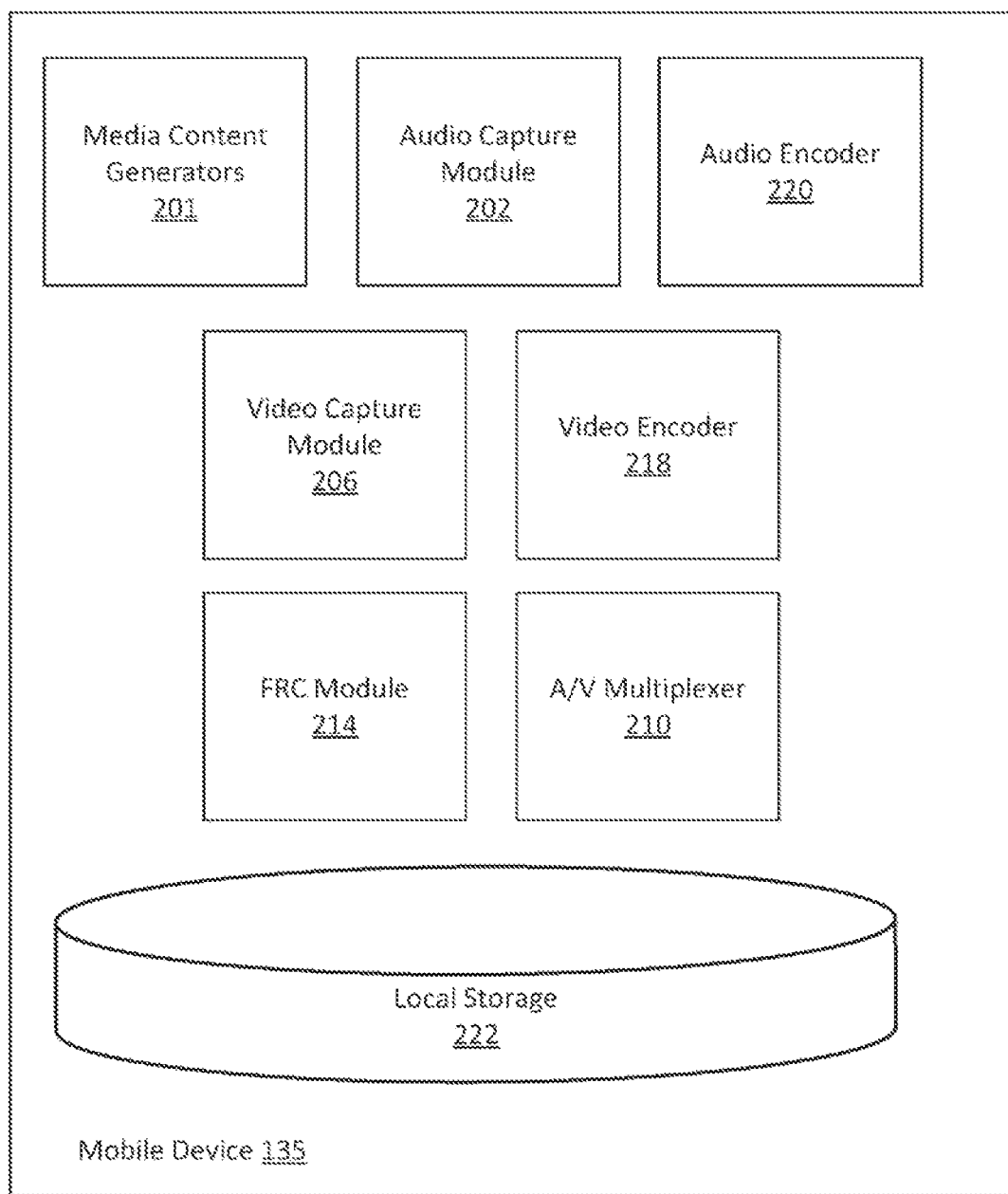
FIG. 2 is a block diagram of a mobile device in accordance with one embodiment.

FIG. 2 illustrates one embodiment of a mobile device 135. In various embodiments, media processing (audio/video decoding/playback or encoding/muxing) on a mobile 135 device uses a pipeline of components. In the embodiment shown in FIG. 2, the mobile device 135 includes one or more media content generators 201, an audio capture module 202, an audio encoder 220, a video capture module 206, a video encoder 218, a frame rate conversion (FRC) module 214, an audio/video (A/V) multiplexer 210, and local storage 222.

In one embodiment, the various components of the mobile device 135 communicate by passing data buffers between them. In another embodiment, communication between components is actively managed by a process that periodically polls each component for empty/full status and drains/fills/transfers buffers accordingly. However, this can incur a significant performance penalty, as maintaining the flow for audio can involve using a high polling rate, which in turn consumes processing resources that could otherwise be dedicated to the applications running on the mobile device 135. When the goal of the media pipeline is to record the behavior of another executing target application (e.g., a game), the added overhead can detract from the performance of the target application.

In some embodiments, an asynchronous architecture is used to manage the data flow so that the overhead is reduced on mobile device 135. As audio/video codecs consume or generate data, the mobile device 135 generates a control interrupt. The relevant component of the mobile device 135 can then quickly take action and either request input buffers to be filled by the generating component (e.g., audio capture module 202) or pass them to a consumption component (e.g., the A/V multiplexer 210), each of which executes asynchronously as well. In one embodiment, no software is involved during the normal flow of data, i.e., only errors generate an interrupt to software.

The media content generators 201 create media content of one or more types. In various embodiments, the media content generators include game applications executing on the mobile device 135, other applications executing on the device, the operating system of the device, one or more cameras of the device, and one or more microphones of the device. In one embodiment, the media content includes video layers and audio layers. The mobile device 135 combines the video layers into a single output layer and presents them on a screen or other display. For example, the video layers might include the graphics of a game, a view of the user taken with a front-facing camera, and a set of notification icons generated by the operating system. In this scenario, the mobile device 135 might display the game graphics full-screen, overlay the view of the user in the top-right corner of the screen, and either hide the notification icons or display them in a notification bar at the top of the screen. Similarly, the audio layers are mixed together and played through a speaker.

The audio capture module 202 selectively captures audio layers for screencasting. In one embodiment, the audio capture module 202 provides a user interface with which a user can select the audio layers to include in the media content for screencasting. For example, a user might elect to include the audio generated by a particular game and the mobile device's microphone, but not system notifications or the output of a music player. Thus, the user can listen to music and be notified of events (e.g., incoming calls and text messages) without those elements of the local audio being recorded as part of the screencast media content. In another embodiment, the audio layers that are captured for screencasting are pre-determined.

The audio encoder 220 uses an audio codec to encode the selected audio layers. In one embodiment, the audio encoder 220 selects and configures the codec at the start of a live streaming session based on the available hardware at the mobile device 135. In another embodiment, the audio encoder 220 dynamically adjusts encoding parameters based on resource availability. For example, the bit rate can be reduced when network bandwidth is scarce. This dynamic adjustment can be performed automatically or in response to user input.

The video capture module 206 selectively captures video layers for screencasting. In one embodiment, the video capture module 206 provides a user interface with which a user can select the video layers to include in the media content for screencasting. For example, a user might elect to include the video generated by a particular game and the mobile device's front-facing camera, but not system notifications. Thus, the user can be notified of events (e.g., incoming calls and text messages) without those elements of the local display being recorded as part of the screencast media content. In another embodiment, the video layers that are captured for screencasting are pre-determined.

The video encoder 218 uses a video codec to encode the selected video layers. In one embodiment, the video encoder 218 selects and configures the codec at the start of a live streaming session based on the available hardware at the mobile device 135. In another embodiment, the video encoder 218 dynamically adjusts encoding parameters based on resource availability. For example, the quality or frame rate can be reduced when network bandwidth is scarce. This dynamic adjustment can be performed automatically or in response to user input.

In one embodiment, when screencasting, raw video frames are generated by the media content generator 201 at the refresh rate of the display, and these frames are fed directly into a video encoder 218. In other embodiments, the target frame rate for the video does not match the display refresh rate. Therefore, the mobile device 135 includes a FRC module 214 that sits between the media content generators 216 and the video encoder 218. In one such embodiment, the FRC module 214 maintains a small buffer of frames (e.g., one frame), and then pushes frames out in a "leaky bucket" style to the video encoder 218, which acts as the consumer. Buffer overflow does not occur, as the FRC module 214 is responsible for applying a policy to select the most meaningful frame at any given time for output, dropping or duplicating frames as needed.

In various embodiments, the A/V multiplexer 210 combines the encoded video and audio data in to a single media container object. Examples of media container objects include AVI, MP4, MOV, and WebM. In other embodiments, the video and audio components are kept separate and the A/V multiplexer 210 generates metadata indicating how the two should be synchronized during playback.

In one embodiment, the local storage 222 is one or more non-transitory computer-readable media that store the various codecs available to the video encoder 218 and audio encoder 220 as well as any media content that the user elects to save.

In various embodiments, media content is streamed live from a mobile device 135 via a transmission control protocol (TCP) connection to access a remote server (e.g., video hosting service 105) through a firewall. TCP is known for its slow flow control mechanisms that do not drop data, both of which can be detrimental to live video streaming. When network quality of service deteriorates, the sender would like to reduce its transmission rate, drop video data, etc. Unless the remote server utilizes an out-of-band flow control mechanism, such as real-time transport control protocol (RTCP), the client/sender cannot react to changing network conditions.

To address this, various embodiments use a scheme whereby the mobile device 135 can detect network conditions locally with no feedback from the remote host and adjust its transmission accordingly. According to the scheme, each chunk of encoded media content data is queued to a separate network transmission processor. The depth of this queue relative to chunk data size is then monitored. An increasing queue depth indicates network congestion, and the encoding process can be adjusted accordingly.

In an alternate scheme, as encoded media content data is generated, a locally created timestamp is assigned to chunks of data (e.g., network abstraction layer (NAL) units as they exit the video encoder 218). These data chunks are transmitted over the streaming TCP connection, and the start/end time of transmission is noted. The latency between data generation and transmission start and the outgoing transmission rate are monitored. In some embodiments, when monitoring such values, common mathematical techniques such as exponential moving averages and hysteresis are employed to smooth out individual changes and reaction thresholds accordingly. Increases in these values indicate network congestion or other network issues, and the encoding process can be adjusted accordingly, (e.g., by dropping data, reducing the encoder bitrate, etc.). Additionally, to address the issue of long transmission delays, the time between subsequent data chunks can be determined by tracking the time at which frames enter the encoder or via apriori knowledge of the frame rate, and when transmission time for a chunk exceeds its allotted time or the expected transmission time based on expected bandwidth, a low network capacity situation can be detected.

In one embodiment, a transmission window scheme can be employed without relying on remote acknowledgements. Instead, the successful transmission of a chunk of data includes an implicit acknowledgement, and transmission credits are consumed periodically while a transmission request is active and returned when transmission completes. If the number of credits drops too low, network congestion is indicated. The number of credits to return to the pool of available credits when a chunk is transmitted successfully is determined by the frame rate.

Figure 3:
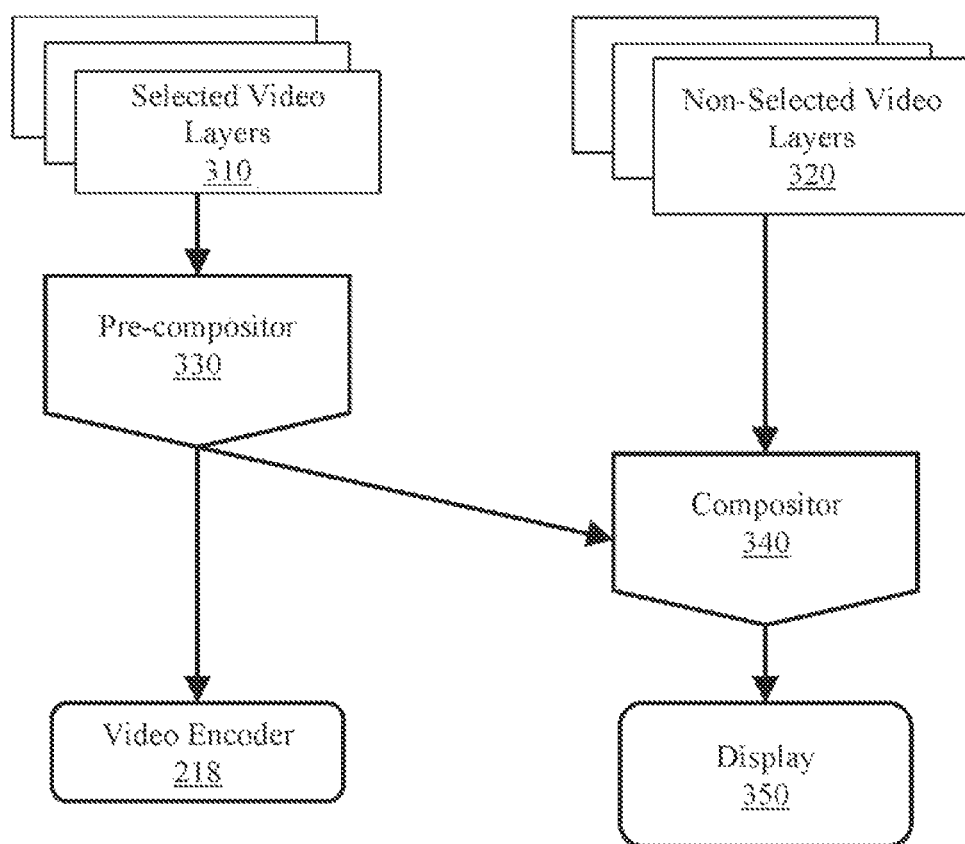
FIG. 3 is a block diagram illustrating display sandboxing in accordance with one embodiment.

FIG. 3 illustrates a conceptual buffer scheme for display sandboxing, according to one embodiment. A limitation of some existing display recording mechanisms for remote displays is that they can only capture the entire screen, which introduces a privacy issue for users, as unanticipated content may be captured. In some embodiments, this issue is addressed by duplicating the display content of a target application into a separate layer or a secondary virtual display, but this can impact latency and performance. In other embodiments, this functionality is migrated into the graphics framework where the display output for a particular application can be sandboxed.

In some embodiments, selected video layers 310 are passed to a pre-compositor 330 that composites them into a single output layer. This output layer is then passed to a video encoder 218 (for encoding into a stream for screen-casting) and a compositor 340. The compositor 340 also receives the non-selected video layers 320 and composites them with the output layer produced by the pre-compositor to produce a local display layer. This local display layer is passed to the display 350 of the mobile device 135 for local presentation. Thus, the graphics framework of the mobile device 135 is extended to pre-composite the layers used by a particular application and route them to both a video encoder 218 and a downstream compositor 340, which prepares the local display. In one embodiment, video buffers support multiple consumers to avoid additional data copies being made. Note also that many applications, particularly games, utilize a single layer, and as a result a fast path can be employed in which there is no pre-composite step, thereby freeing graphics hardware resources.

Figure 4:
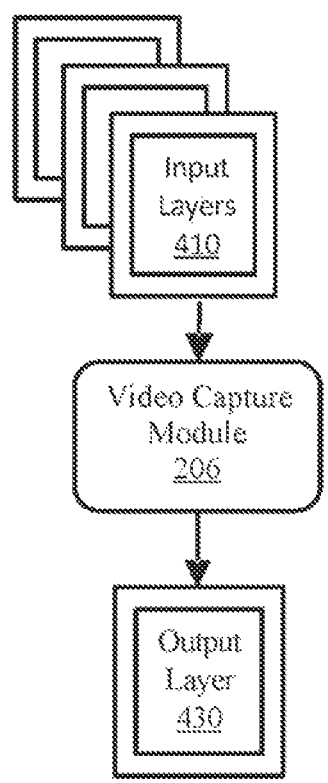
FIG. 4 is a block diagram illustrating operation of a video capture module in accordance with one embodiment.

FIG. 4 illustrates operation of a video capture module 206, according to one embodiment. Screencast support can be delivered as a standalone service that other applications (or the system 100) can utilize to make local recordings or stream live. In various embodiments, the video capture module 206 collects a set of input layers 410 that have been selected to record and configures the graphics framework to composite those layers into a single output layer 430. The video capture module 206 provides the target output layer, which is typically the input layer of a video encoder 218 but could be any standard layer so that the application could apply additional effects to the composition, such as frame rate conversion (e.g., using the FRC module 214) or visual transforms. The video capture module 206 is responsible for periodically producing a result in the output layer 430. In one embodiment, when a target layer is not set, capture is suspended.

In one embodiment, if all layers are specified for capture, a virtual display for a presentation with auto mirroring is used to generate the composited result of the entire screen. In some implementations, this requires either privileged access to core functionality or an explicit grant of permission from the user.

Figure 5:
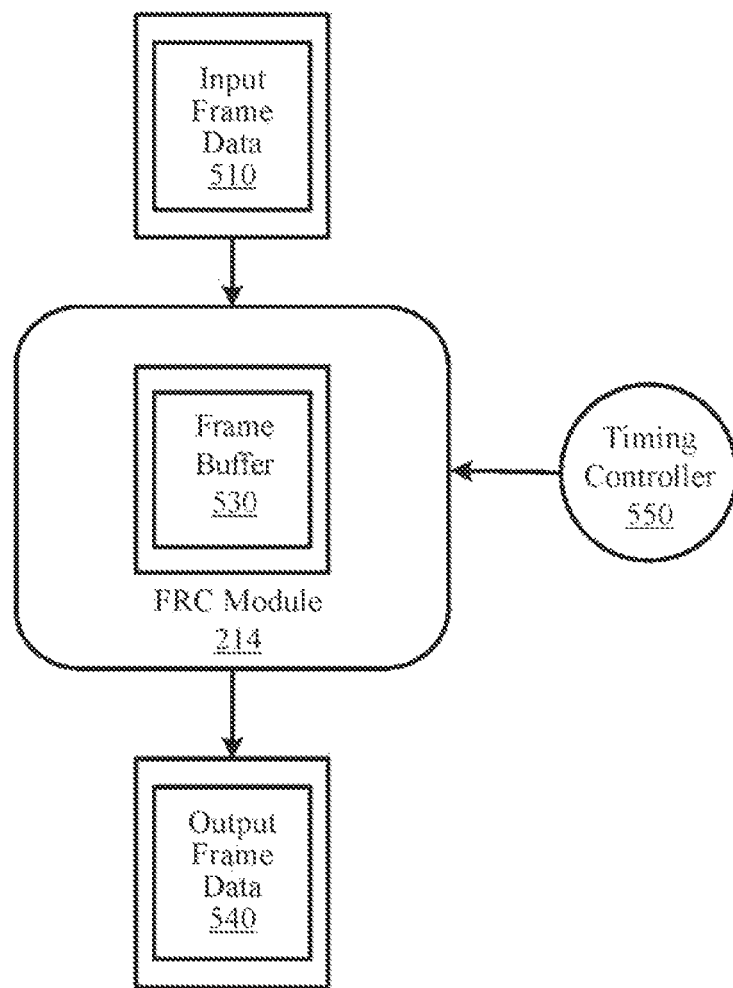
FIG. 5 is a block diagram illustrating operation of a frame rate conversion module in accordance with one embodiment.

FIG. 5 illustrates operation of a frame rate conversion module 214, according to one embodiment. In embodiments using a virtual display to source the capture frames, the underlying framework generates frames according to the update rate of the active applications. GL-based applications, such as games, update the display at 60 Hz, or as close as possible, depending on available resources. On the other hand, applications that are fairly static may generate frames only sporadically, e.g., at less than 1 Hz. One downside of a high frame rate scenario is that it can unnecessarily tax the video encoder 218 when the resulting video need only be at a lower frame rate (e.g., 30 Hz). For example, if a display system is not equipped to handle high frame rate video, the video will need to be down-converted. In contrast, in a low frame rate scenario, the receiving system (e.g., a YouTube live ingestion server) might require a GOP duration of approximately one to two seconds, and slow frame rates will exceed such requirements, resulting in video that is unplayable.

In various embodiments, the FRC module 214 accepts input frames 510 (e.g., the output layer 430 from the video capture module 202) at any rate and outputs frames 540 at a constant target rate (e.g., 10 Hz, 20 Hz, 30 Hz, 40 Hz, etc.).

In one embodiment, the FRC module 214 utilizes a single frame-sized buffer 530 to hold the current output frame. In another embodiment, a buffer 530 that holds a greater number of frames (e.g., two frames) is employed for better performance at the cost of additional memory resources. As frames are input to the FRC module 214, they overwrite the frame buffer 530. A timing controller 550 directs the FRC module 214 to output the content of the frame buffer 530 at the constant target rate. This enables an incoming high frame rate to be down-converted to a lower frame rate by dropping frames, and steps up a lower frame rate by duplicating frames. In some embodiments, the FRC module 214 interpolates between frames using known up/down sampling algorithms.

Figure 6:
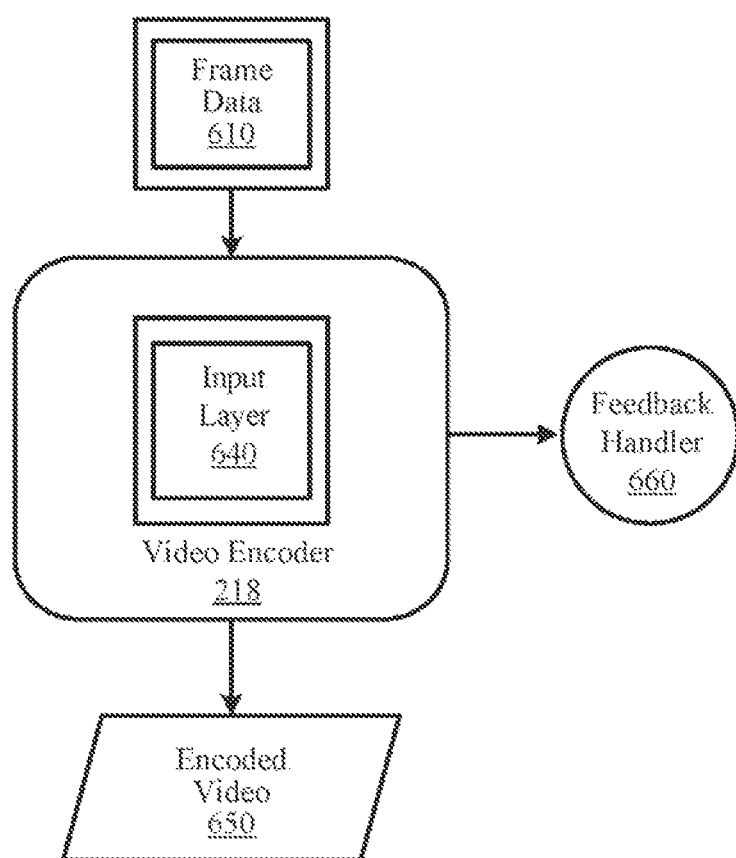
FIG. 6 is a block diagram illustrating operation of a video encoder in accordance with one embodiment.

FIG. 6 illustrates operation of a video encoder 218, in accordance with one embodiment. In the embodiment shown, the video encoder 218 receives frame data 610 (e.g., the output frame data 540 from the FRC module 214), selects a video codec based in part on available hardware support, and configures the video encoder parameters. The video codec provides an input layer 640, which the application can pass to the video capture module 206 or the FRC module 214 to be fed with data. Alternatively, the application can feed itself directly with data. In one embodiment, the application provides a reference to a muxer (e.g., A/V multiplexer 210) where the outputted encoded video 650 should be directed.

In some embodiments, the video encoder 218 is responsible for periodically draining its output buffer and feeding the resulting data to the provided muxer handle. If it gets behind, the video encoder 218 drops frames. In one embodiment, the video encoder 218 notifies a feedback handler 660 that frames have been dropped. The feedback handler 660 can then take corrective action, such as reducing the quality of video captured by the video capture module 206, reducing the target frame rate for the FRC module 214, and the like. Thus, the video encoder 218 can respond to external resource constraint issues (e.g., network delays) without directly monitoring them.

In various embodiments, the feedback handler 660 monitors one or more feedback measures to determine whether the desired output frame rate (e.g., 30 Hz) is being achieved. In one embodiment, feedback handler 660 monitors an output buffer of the video encoder 218 and looks for buffer overflows (i.e., frames are being generated faster than they are output). In another embodiment, a credits system is used in which only a certain number of chunks of data can be transmitted at once. Credits are assigned to chunks of data to be transmitted and returned once transmission is successfully completed. If a new chunk of data is generated and there are insufficient credits to assign to it, this indicates that corrective action (e.g., reducing video quality or frame rate) is required. In still another embodiment, the feedback handler 660 monitors transmission time for data packets. If the time between generation and transmission gets above a threshold value (or is detected to be increasing), this indicates corrective action may be required.

Figure 7:
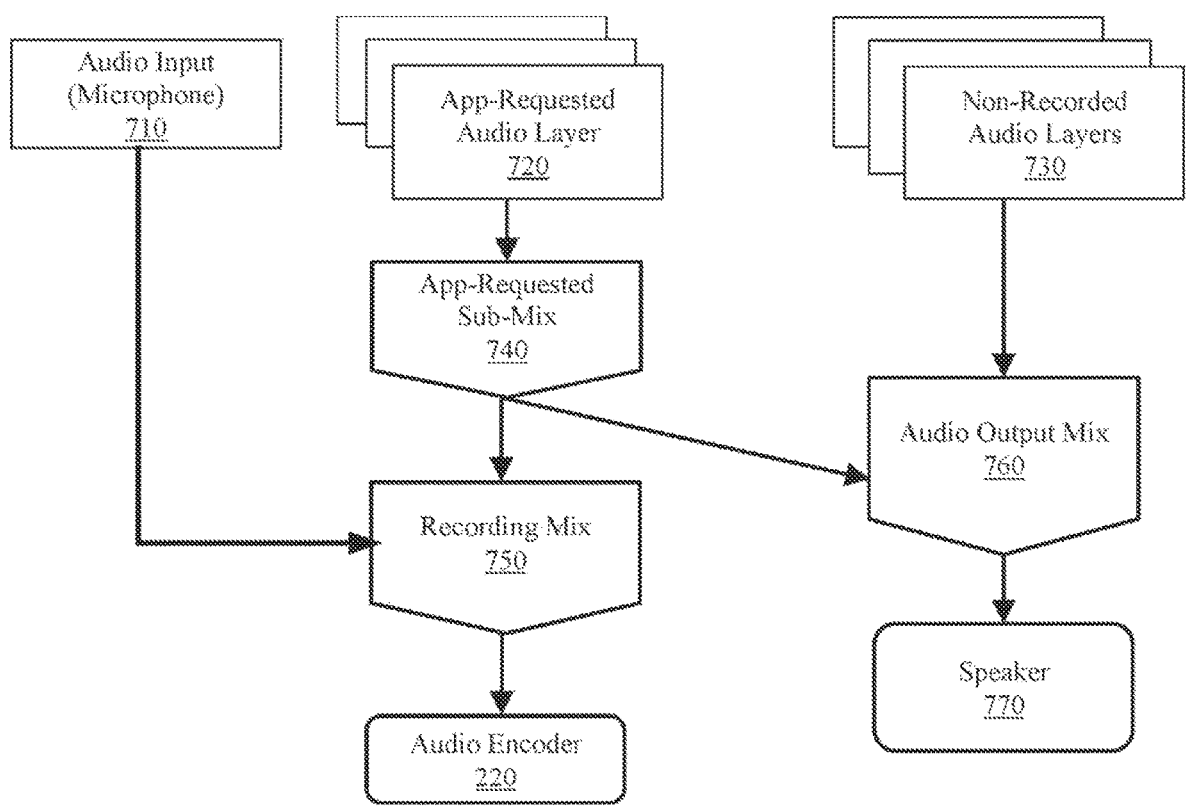
FIG. 7 is a flow chart of a conceptual buffer scheme for audio sandboxing in accordance with one embodiment.

FIG. 7 illustrates a conceptual buffer scheme for audio sandboxing, according to one embodiment. A limitation of some existing audio recording mechanisms for remote displays is that it can include audio streams from other applications or the operating system, which introduces a privacy issue for users, as unanticipated audio may be recorded. In one embodiment, the media framework is extended to sandbox the audio for recording by enabling applications to specify the audio tracks to be recorded, as well as the underlying support to create a mix of those tracks for duplication and delivery to the encoder. Typically, an application would specify its own audio tracks for inclusion, but it may also specify the microphone input for inclusion (e.g., using a sub-mix for the encoder that is not a pre-mix of the audio output).

In one embodiment, the audio inputs are conceptually separated into three groups: local audio input 710 (e.g., from a microphone), audio layers the application has requested be recorded 720 (e.g., its own audio), and other audio layers that are not to be recorded 730 (e.g., system notifications and phone calls). A user specifies which audio sources to record. For example, the user might want to stream audio from a game application and from the microphone, but not from the phone application, such that audio and visual notifications of an incoming call to the mobile device 135 will not be included in the broadcast.

Where more than one application-requested audio layer 720 is selected, these layers are sub-mixed 740. In one embodiment, the audio layers 720 are mixed using the raw output levels from the corresponding applications. In another embodiment, the audio capture module 202 applies automatic normalization to each layer to balance the levels. In yet another embodiment, the user can specify the level of each layer in the sub-mix 740. If the local audio 710 is selected to be included, the audio capture module 202 combines this with the sub-mix 740 to create a recording mix 750. As with the sub-mix 740, raw output levels, automatic normalization, or user specified levels can be used to determine the relative volume levels for the sub-mix and the local audio 710. The recording mix 750 is passed to the audio encoder 220 for encoding.

In one embodiment, the sub-mix 740 is separately combined with the audio layers that are not to be recorded 730 to create an audio output mix 760. As with the other mixing of audio layers, raw output levels, automatic normalization, or user specified levels can be used to determine the relative volume levels for the sub-mix 740 and the non-recorded layers 730. The audio output mix 760 is passed to one or more speakers 770 of the mobile device 135 for local presentation. Thus, the local audio output and the audio that is recorded can include different layers of the available audio.

Figure 8:
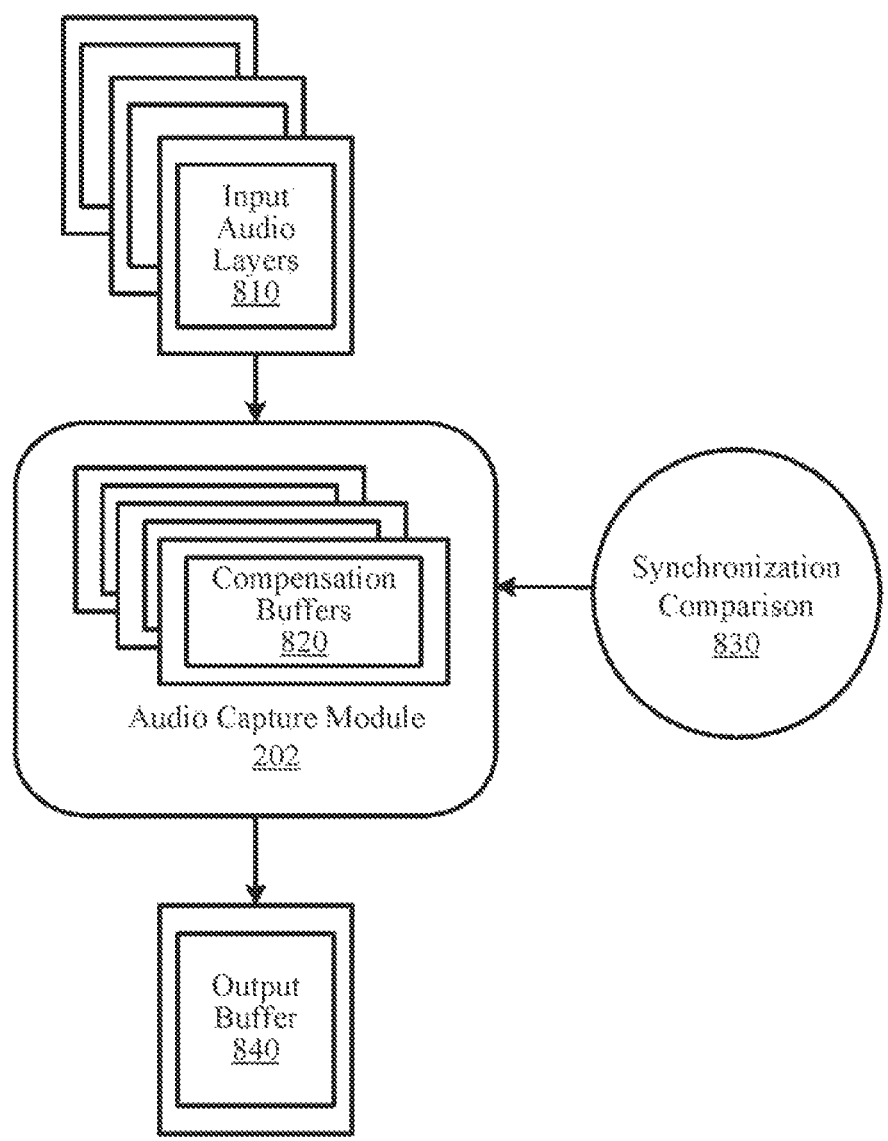
FIG. 8 is a block diagram illustrating operation of an audio capture module in accordance with one embodiment.

FIG. 8 illustrates operation of an audio capture module 202, according to one embodiment. In the illustrated embodiment, the audio capture module 202 collects a set of input audio layers 810 (e.g., audio tracks that an application would like to record) and configures the audio framework to mix those tracks for recording. In some embodiments, the input audio layers 810 includes the microphone input.

In various embodiments, the audio capture module 202 provides compensation buffers 820 for storing the mixed audio data. In one embodiment, the audio capture module 202 also provides an output buffer 840 in response to a request from the audio encoder 220. In other embodiments, the audio capture module 202 also performs audio processing. The audio capture module 202 periodically triggers the mixer (e.g., to generate a recording mix 750) and stores the result in the output buffer 840. If at any point no output buffer is provided, capture is suspended.

In some embodiments, a data object is used to represent the application audio tracks 720, and a separate thread is used to poll the audio hardware and feed the output buffer 840. In one such embodiment, the data object is also used to read and mix sample data from the microphone 710. However, this approach may consume valuable resources, and the poll-based nature of the scheme can have the side effect of some data being lost, as the poller is detached from the audio encoder pipeline. In another embodiment, the microphone 710 is used to capture both device audio (as emitted from the speakers 770), as well as voice or other audio input from the user. This approach has the benefit of simplicity and low cost but lacks the flexibility of decoupling capture of system audio from the external audio (e.g., headphones with an external microphone cannot be used). This approach can also result in lower quality system audio capture. However, if a free running process is used to continuously read sample data from the microphone source and feed it to the audio encoder 220, on-demand capture from the audio encoder 220 is less likely to fall behind.

In various embodiments, these potential shortcomings are addressed through employment of a set of additional internal compensation buffers 820 to hold captured data that becomes available before new output buffers 840 are ready. Thus, fluctuations in system scheduling delays can be compensated for in most circumstances. However, in the event of excessive latency where other higher priority tasks are executing, some data may still be dropped.

In various embodiments, each output audio sample buffer 840 is tagged with a presentation timestamp for the encoder 218. To reduce the impact of scheduling delays, the timestamps are calculated based on the audio sample rate and number of samples delivered. This can result in high quality playback, but the playback can drift from the corresponding video frames over time. Thus, a synchronization comparison process 830 monitors the difference from real time using an exponential moving average to smooth out temporary scheduling anomalies. When the deviation becomes too high, the presentation timestamps are corrected to bring them closer to real time. In one such embodiment, this update is made as a single, abrupt change. In another embodiment, the update is made by a small set of changes over a longer interval. In a further embodiment, whether a single abrupt change or a series of gradual changes are used is determined based on the magnitude of the deviation relative to tolerances of the human ear. For example, a simple skip-ahead approach with small deviation threshold can be employed, so that the resulting audio artifact is not objectionable to the average listener.

Figure 9:
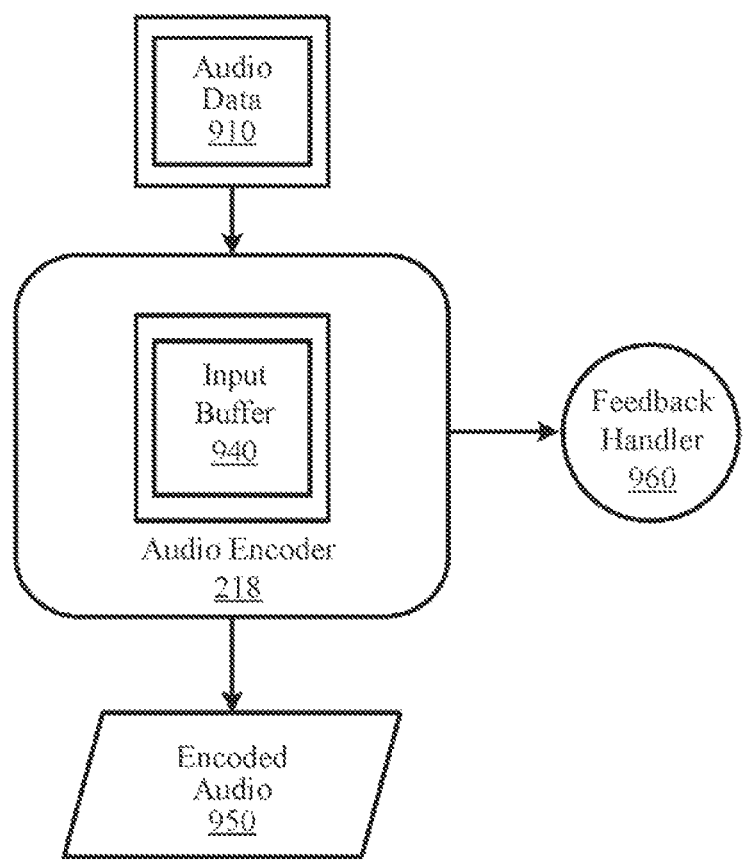
FIG. 9 is a block diagram illustrating operation of an audio encoder in accordance with one embodiment.

FIG. 9 illustrates operation of an audio encoder 220, according to one embodiment. In the embodiment shown, the audio encoder 220 receives audio data 910 (e.g., the output buffer 840 from the audio capture module 202), selects an audio codec based in part on available hardware support, and configures the audio encoder parameters. The audio codec provides an input buffer 940 (e.g., from a queue of such buffers), which the application can pass to the audio capture module 202 or feed directly with data itself The application provides a reference to a muxer (e.g., AN multiplexer 210) where the outputted encoded audio 950 should be directed. In one embodiment, the audio encoder 220 provides an interface for adjusting the encoding parameters dynamically, which can be used to alter the quality and resource requirements according to resource constraints. For example, the bit rate can be reduced when network bandwidth is scarce.

In some embodiments, the audio encoder 220 periodically drains its output buffer and feeds the resulting data to the provided muxer handle. If it gets behind, the audio encoder 220 fills in empty data (silence). In one embodiment, the audio encoder 220 notifies a feedback handler 960 that silence has been inserted. The feedback handler 660 can then take corrective action, such as reducing the encoder bit rate. Thus, the audio encoder 220 can respond to external resource constraint issues (e.g., network delays) without directly monitoring them.

In various embodiments, the feedback handler 960 monitors one or more feedback measures to determine whether the desired output rate is being achieved. Possible feedback measures include buffer overflows, a credits system, and transmission times for data packets, as described above with references to FIG. 6. If the feedback indicates that the stream is not achieving the desired output rate, the audio encoder 220 reduces the quality of the audio to compensate (e.g., by reducing encoder bit rate).

Figure 10:
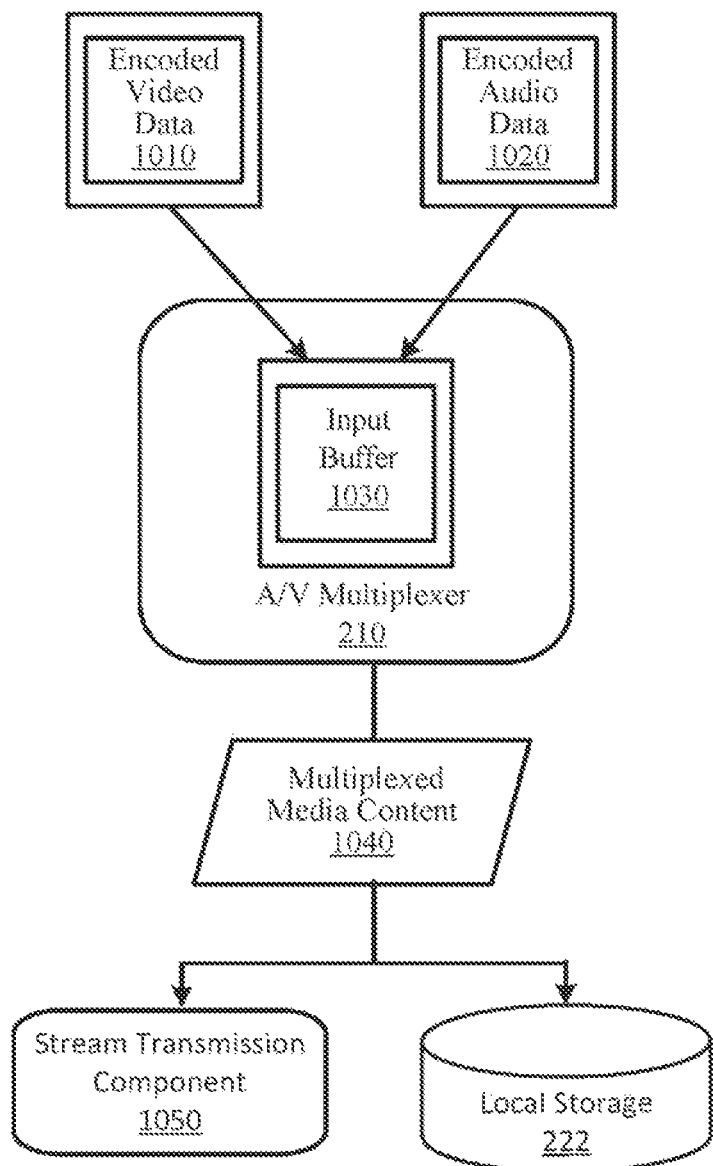
FIG. 10 is a block diagram illustrating operation of an A/V multiplexer in accordance with one embodiment.

FIG. 10 illustrates operation of an A/V multiplexer 210, according to one embodiment. The A/V multiplexer 210 receives encoded video data 1010 (e.g., an encoded video stream 650 produced by the video encoder 218) and encoded audio data 1020 (e.g., an encoded audio stream 950 produced by the audio encoded 220). The A/V multiplexer 210 stores the received data in an input buffer 1030 and multiplexes it to produce multiplexed media content 1040. In one embodiment, the multiplexed media content 1040 is packaged in a single container format (e.g., AVI, MP4, or MOV, WebM). The multiplexed media content 1040 can be directed to a stream transmission component 1050 for live streaming, directed to local storage 222 to be saved (e.g., for later uploading), or both.

In one embodiment, where the multiplexed media content 1040 is being directed to local storage 222 (e.g., in MP4 format), the process is halted when the local storage reaches full capacity. Additionally, the available capacity can be periodically provided to the application, which can then take action in advance of completely consuming local storage.

In embodiments where the multiplexed media content 1040 in streamed live (e.g., broadcasting the video via video hosting service 105, substantially in real time), the stream transmission component 1050 handles call setup, manages a network connection to the video hosting service ingestion servers, and addresses any feedback and synchronization issues associated with the channel. Network quality feedback is provided to the application so that it can adjust the screencast recording configuration in response. An example of a container format suitable for live streaming is the RTMP format with AVC video and AAC audio. One of skill in the art will recognize that other container formats may be used.

The above components can be combined in a flexible configuration that enables the application to intercept the pipeline at various points and perform its own processing on the data. However, some applications will simply want to utilize standard configurations and standard feedback handlers. Consequently, default policy modules for recording to a local file and live streaming are included in various embodiments. These modules connect the components so that the application merely requests a file or stream pipeline, and they optionally handle adjustments between the quality levels. For example, policy modules can be used to configure the screencast pipeline whereby videos may be in any of a variety of video file formats and stream formats, and the pipeline configurations may include audio or not, have single or multiple video tracks, etc.

Figure 11:
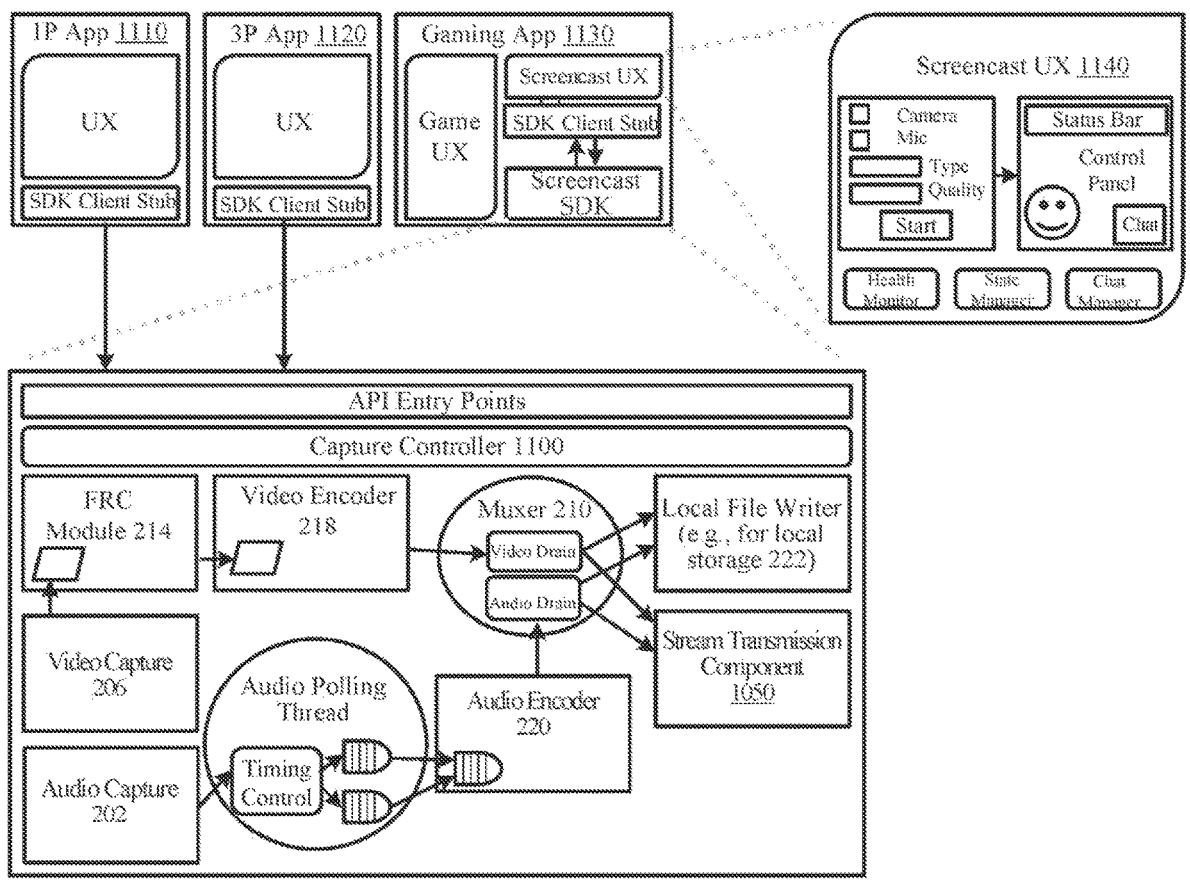
FIG. 11 is a block diagram illustrating operation of a stream capture system in accordance with one embodiment.

FIG. 11 illustrates the integration of the screencast system described above into a complete application for deployment, according to one embodiment. In the embodiment shown, the screencast service includes a service to host the API entry points from the application. Interface requests are dispatched to a capture controller 1100 that maintains a state machine for the capture and recording/streaming of the screen contents and microphone inputs. The capture controller 1100 executes in its own process and address space in order to isolate its effects from the host application and the target applications to capture. The capture controller 1100 instantiates the necessary screencast components outlined above and connects their various inputs and outputs to establish the full capture pipeline. It then manages the control plane between the components to ensure the pipeline operates correctly, that any error states are propagated back to the host application, and that the pipeline is properly dismantled upon request or in the event of fatal error conditions.

In one embodiment, the video input is driven asynchronously by a virtual display established to mirror the screen contents. As frames are generated, they are delivered to the FRC module 214, which drops or duplicates frames using a single GL-based frame buffer with hardware acceleration when present. The FRC module 214 releases frames to the video encoder 218 at a target 30 Hz. The video encoder 218 operates in an asynchronous fashion, delivering empty buffers to the FRC module 214 as they become available. Thus, it is possible for the video encoder 218 to get behind the FRC module 214 and not have buffers available when needed. However, in many implementations, this does not occur in practice, so the optimization of omitting further buffering in the FRC module 214 can be employed to conserve resources.

In various embodiments, the audio input is continuously sourced at the line rate of the microphone input 710 and fed to the audio encoder 220 as buffers become available. While it is possible to read the audio input 710 on demand as input buffers become available from the audio encoder 220, where a high sample rate is used (e.g., 44.1 KHz), the buffers may be delayed enough that the audio input does not keep up with the line rate. Therefore, in one embodiment, a separate audio process running at high priority is used to continuously read from the audio input 710 and ensure that samples are captured at the line rate. This may require additional buffering within the audio capture module 202 to hold sample data when input buffers from the audio encoder are delayed. When an encoder buffer becomes available, data from the oldest rate compensation buffers 820 are first copied to the encoder input buffers 940. If all the compensation buffers 820 are empty, audio data is read directly into the encoder input buffers 940. If all the rate compensation buffers 820 are full when the next samples are due to be read from the audio source, the oldest buffer is discarded in favor of the latest data, resulting in a gap in the audio stream. The size and quantity of rate compensation buffers 820 can be chosen based on empirical studies so as to minimize such dropouts. Finally, computed timestamps based on the sample rate and quantity read can be used to ensure smooth audio playback.

In various embodiments, the A/V multiplexer 210 executes in a separate thread for performance isolation, and it is driven via an event model from the encoders. As audio or video output buffers become available, the A/V multiplexer 210 is triggered, which then multiplexes the two streams into a unified container format (e.g., MP4 for recording to a file, and RTMP for live streaming). Executing in its own thread also enables the A/V multiplexer 210 to perform such tasks in a synchronous fashion, thereby simplifying its control logic without impacting the user experience. In one embodiment, a muxer factory is used to select an appropriate A/V multiplexer 210 based on the schema in a URI pattern used to name the target. Support for other schemas and container formats can thus be added in a straightforward manner. Muxers typically adhere to an interface that provides feedback to the controlling system (e.g., the capture controller 1100). For example, the file muxer monitors available storage and warns as it runs low, and the stream muxer monitors network load and warns when an appropriate data rate cannot be maintained.

In various embodiments, the screencasting functionality provided by the capture controller 1100 can be accessed by a first party screencasting application (e.g., IP App 1110) using a developer interface, a third party screencasting application (e.g., 3P App 1120) via a client interface exposed through a software development kit (SDK) over standard interprocess communication, or remote procedure call mechanisms provided by the operating system. Alternatively, the screencasting functionality can be accessed directly from a game application (e.g., Gaming App 1130) by integrating the capture controller library/SDK directly into the application.

In various embodiments, the screencast capture and recording/streaming host application 1140 provides user experience (UX) integration, although common UI components could also reside within the screencast service so as to enable a consistent experience across applications. UI components utilized by one embodiment of a sample host application include: green room launch dialogs, a control panel, a status bar, and a chat window. The green room launch dialogs are a series of screens that explain the feature to the user and provide a means for the user to configure a screencast session, specifying the type and quality of screencast, the application to capture, and providing the opportunity to notify the audience via social media. The control panel provides controls for managing a screencast session once it is established. The status bar provides information about the current session and the chat window enables the user to discuss the session with those viewing it while live streaming.

In one embodiment, once a screencast session is configured, a host service manages the UI state in concert with the capture controller state. The host service directs the remote screencast service to initiate and stop screencasting, and ensures that feedback from the screencast service is reflected in a user-visible fashion. This includes a health monitor, which reports the status of a recording or live stream in an on-screen status bar that floats above other UI components. Additionally, a chat manager component monitors chat messages for live streams and presents them in a floating chat window as they arrive. The primary UI component, though, is the control panel, which the user employs to manage the screencast. The control panel includes a self-view from either the front facing camera or the user's avatar. The control panel is also a floating window that sits atop all other UI components. In this way, the camera view can be captured directly via the screencast capture, rather than requiring recording a video from the camera and overlaying it atop the captured video frames. The control panel includes a set of control buttons to enable/disable audio capture, the camera view, and the chat window. It also includes a button to start/stop the screencast session.

Figure 12:
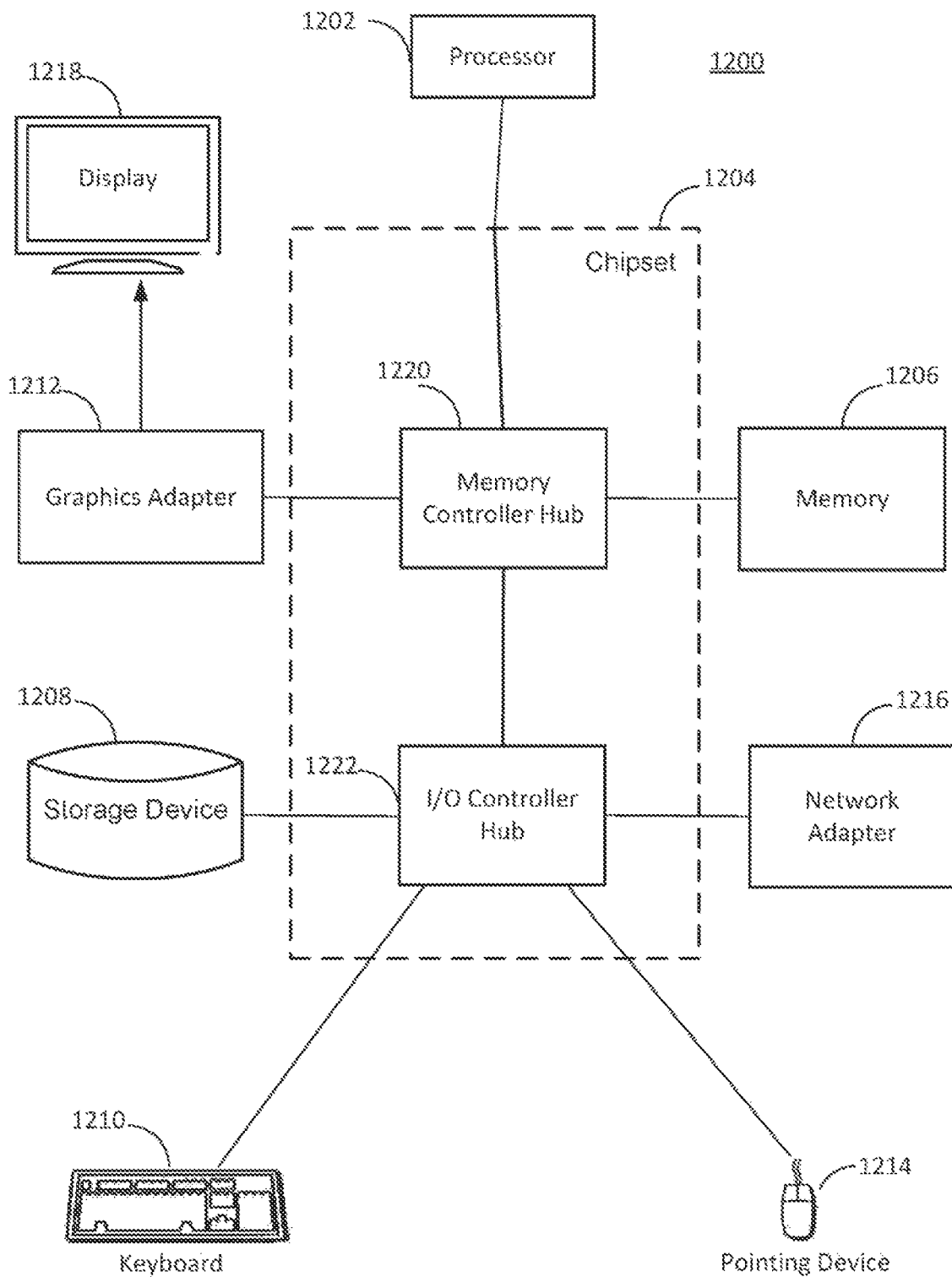
FIG. 12 is a high-level block diagram illustrating an example of a computer for use in a stream capture system according to one embodiment.

FIG. 12 is a high-level block diagram illustrating one embodiment of a computer 1200 for use in a stream capture system 100. Illustrated are at least one processor 1202 coupled to a chipset 1204. The chipset 1204 includes a memory controller hub 1250 and an input/output (I/O) controller hub 1255. A memory 1206 and a graphics adapter 1213 are coupled to the memory controller hub 1250, and a display device 1218 is coupled to the graphics adapter 1213. A storage device 1208, keyboard 1210, pointing device 1214, and network adapter 1216 are coupled to the I/O controller hub 1255. Other embodiments of the computer 1200 have different architectures. For example, the memory 1206 is directly coupled to the processor 1202 in some embodiments.

The storage device 1208 includes one or more non-transitory computer-readable storage media such as a hard drive, compact disk read-only memory (CD-ROM), DVD, or a solid-state memory device. The memory 1206 holds instructions and data used by the processor 1202. In one embodiment, program modules formed of executable computer program instructions are stored on the storage device 1208, loaded into the memory 1206, and executed by the processor 1202.

The pointing device 1214 is used in combination with the keyboard 1210 to input data into the computer system 1200. The graphics adapter 1213 displays images and other information on the display device 1218. In some embodiments, the display device 1218 includes a touch screen capability for receiving user input and selections. The network adapter 1216 couples the computer system 1200 to the network 1210. Some embodiments of the computer 1200 have different or additional components than those shown in FIG. 12. For example, the video hosting service 105 can be formed of multiple computers 1200 operating together to provide the functions described herein. As another example, the mobile device 135 can be a smartphone or tablet and include a touch-screen that provides on-screen keyboard 1210 and pointing device 1214 functionality.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and process for providing capture, recording, and streaming of media content. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is to be limited only by the following claims.

What is claimed is:

1. A method comprising:
receiving first user input indicating a selection of a subset of two or more audio layers of a plurality of audio layers for media content to be provided to a user, each of the two or more audio layers corresponding to one or more audio sources;
receiving second user input indicating volume levels for the two or more audio layers of the plurality of audio layers;
capturing, based on the first user input, the two or more audio layers of the plurality of audio layers for a media content item to be provided to the user;
enabling audio playback based on the two or more audio layers of the plurality of audio layers and without including other audio layers of the plurality of audio layers, the audio playback reflecting the volume levels indicated by the second user input; and
causing the media content item to be provided to the user using the audio playback reflecting the indicated volume levels.

2. The method of claim 1, wherein enabling audio playback based on the two or more audio layers of the plurality of audio layers and without including other audio layers of the plurality of audio layers comprises:
creating an output audio layer for the media content item by mixing the two or more audio layers of the plurality of audio layers without including other audio layers of the plurality of audio layers.

3. The method of claim 2, further comprising:
determining an output sample rate for the output audio layer;
encoding the output audio layer at the determined output sample rate; and
transmitting the encoded output audio layer to a media hosting service for presentation to the user.

4. The method of claim 3, further comprising:
identifying a capability of a local device of the user; and
selecting a codec to perform the encoding of the output audio layer based on the capability of the local device.

5. The method of claim 4, wherein the capability of the local device is based on hardware of the local device or a bandwidth associated with the local device.

6. The method of claim 3, further comprises converting an initial sample rate of the output audio layer to the determined output sample rate, wherein converting the initial sample rate to the determined output sample rate comprises (i) dropping one or more samples associated with the output audio layer in response to the initial sample rate being higher than the determined output sample rate, or (ii) duplicating one or more samples associated with the output audio layer in response to the initial sample rate being lower than the determined output sample rate.

7. The method of claim 1, wherein the plurality of audio layers comprise a local audio input layer, an application audio layer, a system notification audio layer and a phone call audio layer.

8. The method of claim 1, further comprising:
storing, based on the first user input and the second user input, data identifying the two or more audio layers and data identifying the volume levels of the two or more audio layers.

9. A system comprising:
a memory; and
a processor, operatively coupled with the memory, to perform operations comprising:
receiving first user input indicating a selection of a subset of two or more audio layers of a plurality of audio layers for media content to be provided to a user, each of the two or more audio layers corresponding to one or more audio sources;
receiving second user input indicating volume levels for the two or more audio layers of the plurality of audio layers;
capturing, based on the first user input, the two or more audio layers of the plurality of audio layers for a media content item to be provided to the user;
enabling audio playback based on the two or more audio layers of the plurality of audio layers and without including other audio layers of the plurality of audio layers, the audio playback reflecting the volume levels indicated by the second user input; and
causing the media content item to be provided to the user using the audio playback reflecting the indicated volume levels.

10. The system of claim 9, wherein enabling audio playback based on the two or more audio layers of the plurality of audio layers and without including other audio layers of the plurality of audio layers comprises:
creating an output audio layer for the media content item by mixing the two or more audio layers of the plurality of audio layers without including other audio layers of the plurality of audio layers.

11. The system of claim 10, the operations further comprising:
determining an output sample rate for the output audio layer;
encoding the output audio layer at the determined output sample rate; and
transmitting the encoded output audio layer to a media hosting service for presentation to the user.

12. The system of claim 11, the operations further comprising:
identifying a capability of a local device of the user; and
selecting a codec to perform the encoding of the output audio layer based on the capability of the local device.

13. The system of claim 11, the operations further comprising converting an initial sample rate of the output audio layer to the determined output sample rate, wherein converting the initial sample rate to the determined output sample rate comprises (i) dropping one or more samples associated with the output audio layer in response to the initial sample rate being higher than the determined output sample rate, or (ii) duplicating one or more samples associated with the output audio layer in response to the initial sample rate being lower than the determined output sample rate.

14. The system of claim 9, wherein the plurality of audio layers comprise a local audio input layer, an application audio layer, a system notification audio layer and a phone call audio layer.

15. The system of claim 9, the operations further comprising:
storing, based on the first user input and the second user input, data identifying the two or more audio layers and data identifying the volume levels of the two or more audio layers.

16. A non-transitory computer readable medium comprising instructions, which when executed by a processor, cause the processor to perform operations comprising:
receiving first user input indicating a selection of a subset of two or more audio layers of a plurality of audio layers for media content to be provided to a user, each of the two or more audio layers corresponding to one or more audio sources;
receiving second user input indicating volume levels for the two or more audio layers of the plurality of audio layers;
capturing, based on the first user input, the two or more audio layers of the plurality of audio layers for a media content item to be provided to the user;
enabling audio playback based on the two or more audio layers of the plurality of audio layers and without including other audio layers of the plurality of audio layers, the audio playback reflecting the volume levels indicated by the second user input; and
causing the media content item to be provided to the user using the audio playback reflecting the indicated volume levels.

17. The non-transitory computer readable medium of claim 16, wherein enabling audio playback based on the two or more audio layers of the plurality of audio layers and without including other audio layers of the plurality of audio layers comprises:
creating an output audio layer for the media content item by mixing the two or more audio layers of the plurality of audio layers without including other audio layers of the plurality of audio layers.

18. The non-transitory computer readable medium of claim 17, the operations further comprising:
determining an output sample rate for the output audio layer;
encoding the output audio layer at the determined output sample rate; and
transmitting the encoded output audio layer to a media hosting service for presentation to the user.

19. The non-transitory computer readable medium of claim 18, the operations further comprising:
identifying a capability of a local device of the user; and
selecting a codec to perform the encoding of the output audio layer based on the capability of the local device.

20. The non-transitory computer readable medium of claim 18, the operations further comprising converting an initial sample rate of the output audio layer to the determined output sample rate, wherein converting the initial sample rate to the determined output sample rate comprises (i) dropping one or more samples associated with the output audio layer in response to the initial sample rate being higher than the determined output sample rate, or (ii) duplicating one or more samples associated with the output audio layer in response to the initial sample rate being lower than the determined output sample rate.

21. The non-transitory computer readable medium of claim 16, wherein the plurality of audio layers comprise a local audio input layer, an application audio layer, a system notification audio layer and a phone call audio layer.

22. The non-transitory computer readable medium of claim 16, the operations further comprising:
   storing, based on the first user input and the second user input, data identifying the two or more audio layers and data identifying the volume levels of the two or more audio layers.

\* \* \* \* \*